United States Patent
Chang et al.

(10) Patent No.: US 7,119,050 B2
(45) Date of Patent: *Oct. 10, 2006

(54) FLUID SYSTEM HAVING CONTROLLABLE REVERSIBLE VISCOSITY

(75) Inventors: Frank F Chang, Sugar Land, TX (US); Diankui Fu, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 360 days.

This patent is subject to a terminal disclaimer.

(21) Appl. No.: 10/065,144

(22) Filed: Sep. 20, 2002

(65) Prior Publication Data

US 2003/0119680 A1 Jun. 26, 2003

Related U.S. Application Data

(60) Provisional application No. 60/343,145, filed on Dec. 21, 2001.

(51) Int. Cl.
*C09K 8/72* (2006.01)
(52) U.S. Cl. ............ 507/244; 507/240; 507/266; 507/267; 507/277; 166/305.1
(58) Field of Classification Search ............ 507/244, 507/240, 266, 267, 277; 166/305.1
See application file for complete search history.

(56) References Cited

U.S. PATENT DOCUMENTS

| | | | | |
|---|---|---|---|---|
| 4,324,669 A | 4/1982 | Norman et al. | ........ | 252/8.55 C |
| 4,591,447 A | 5/1986 | Kubala | ........ | 252/8.55 |
| 4,695,389 A | 9/1987 | Kubala | ........ | 252/8.553 |
| 5,009,799 A | 4/1991 | Syrinek et al. | ........ | 252/8.553 |
| 5,101,903 A | 4/1992 | Llave et al. | ........ | 166/294 |
| 5,551,516 A | 9/1996 | Norman et al. | ........ | 166/308 |
| 6,035,936 A | 3/2000 | Whalen | ........ | 166/308 |
| 6,258,859 B1* | 7/2001 | Dahayanake et al. | ........ | 516/77 |
| 6,399,546 B1 | 6/2002 | Chang et al. | ........ | 507/240 |
| 6,435,277 B1 | 8/2002 | Qu et al. | ........ | 166/281 |
| 6,569,814 B1* | 5/2003 | Brady et al. | ........ | 507/201 |
| 6,667,280 B1* | 12/2003 | Chang et al. | ........ | 507/240 |
| 2002/0033260 A1* | 3/2002 | Lungwitz et al. | ........ | 166/278 |
| 2002/0039972 A1 | 4/2002 | Allan et al. | ........ | 507/100 |
| 2003/0166471 A1* | 9/2003 | Samuel et al. | ........ | 507/200 |
| 2003/0236174 A1* | 12/2003 | Fu et al. | ........ | 507/200 |

FOREIGN PATENT DOCUMENTS

| | | |
|---|---|---|
| CA | 1109356 | 9/1981 |
| GB | 2012830 | 8/1979 |
| WO | 01/29369 | 4/2001 |

OTHER PUBLICATIONS

SPE 65033 "*A Novel Self-Deverting-Acid Developed for Matrix Stimulation of Carbonate Reservoirs*" By Frank Chang, Qi Qu, Wayne Frenier.
SPE 73704 "*The Successful Use of Polymer-Free Diverting Agents for Acid Treatments in the Gulf of Mexico*" By Scott M. McCarthy, Qi Qu, Dan Vollmer.

* cited by examiner

*Primary Examiner*—Philip C. Tucker
(74) *Attorney, Agent, or Firm*—Thomas O. Mitchell; Tim Curington; Robin Nava

(57) ABSTRACT

This Invention relates to methods of treating a subterranean hydrocarbons reservoir comprising contacting the formation with a treating fluid comprising an aqueous solution, an acid, a surfactant acting as gelling agent essentially consisting of erucylamidopropyl betaine (or a protonated/deprotonated homolog or salt thereof). The treating fluid may further comprise a lower n-alcohol for improved temperature stability.

10 Claims, 5 Drawing Sheets

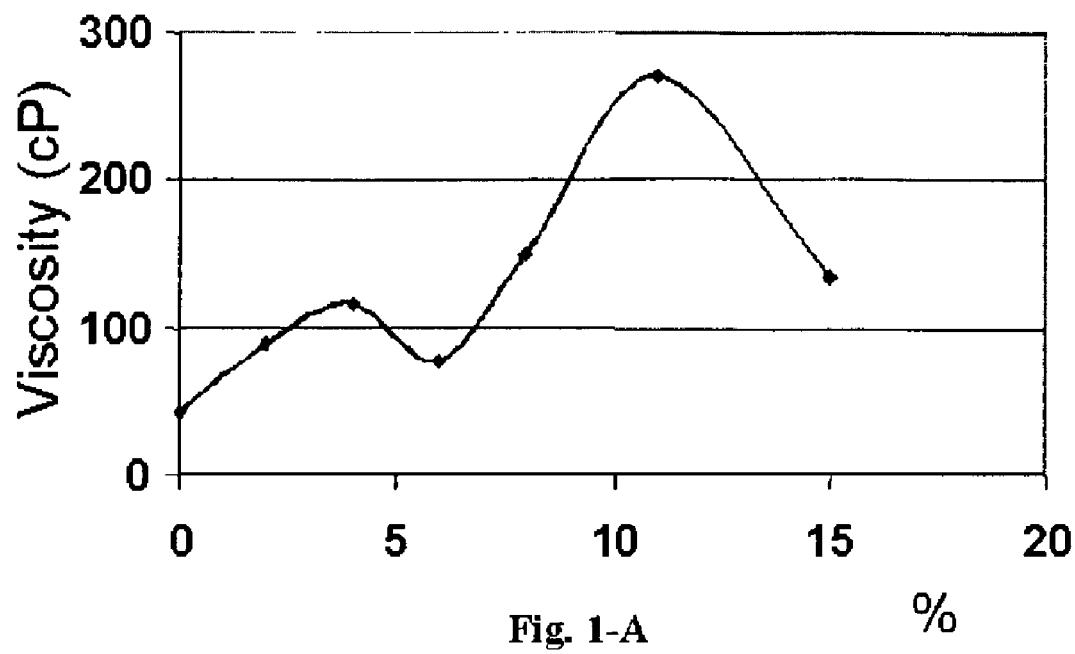
Fig. 1-A
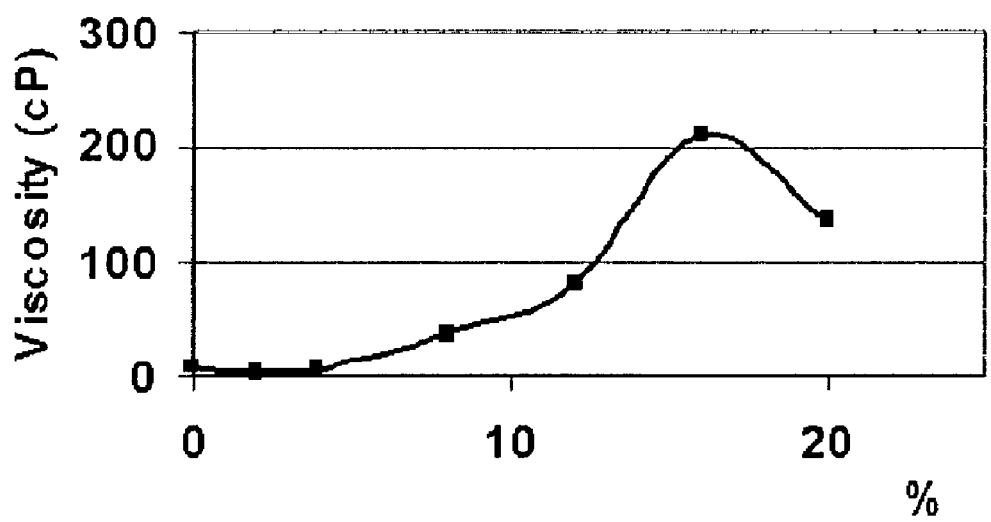
Fig. 1-B

FLUID SYSTEM HAVING CONTROLLABLE REVERSIBLE VISCOSITY

STATEMENT OF COOPERATIVE RESEARCH AGREEMENT

The present invention, as defined by the claims herein, was made by parties to a Joint Research Agreement between Schiumberger Technology Corporation and Rhodia, Inc., as a result of activities undertaken within the scope of that Agreement relating at least to the field of the invention as described below. The Agreement was in effect prior to the date of the invention, and at the time the invention was made.

CROSS REFERENCE TO RELATED APPLICATIONS

This Application is based on the U.S. provisonal application filed Dec. 21, 2001 serial No. 60/343,145.

BACKGROUND OF INVENTION

This invention relates to fluid compositions whose viscosity can be carefully modulated from very low viscosity to sufficient viscosity to act as a barrier to further flow. More specifically, the invention relates to diverting fluids used for stimulating hydrocarbon-bearing formations i.e., to increase the production of oil/gas from the formation.

Hydrocarbons (oil, natural gas, etc.) are obtained from a subterranean geologic formation (i.e., a "reservoir") by drilling a well that penetrates the hydrocarbon-bearing formation and thus causing a pressure gradient that forces the fluid to flow from the reservoir to the well. Often, a well production is limited by poor permeability either due to naturally tight formations or to formation damages typically arising from prior well treatment, such as drilling, cleaning etc.

To increase the net permeability of a reservoir, it is common to perform a well stimulation. The most common stimulation technique consists of injecting an acid that reacts with and dissolves the damage or portion of the formation thereby creating alternative flowpaths for the hydrocarbons to migrate through the formation to the well. This technique known as acidizing may eventually be associated with fracturing the injection rate and pressure is enough to induce the formation of a fracture in the reservoir.

Fluid placement is critical to the success of stimulation treatment. Natural reservoirs are often heterogeneous; the acid fluid will preferentially enter areas of higher permeability in lieu of treating the areas where a treatment is most needed. Similarly, acid treatment tends to remove the damages that are easier to reach, due to a lower degree of damage or higher permeability. Each additional volume of acid fluid follows the path of less resistance, failing to remove the most important damages. The critical character of fluid placement is exacerbated by the fact that the acid reacts extremely quickly and consequently, is spent almost immediately and therefore not available for treating the untreated areas.

In order to control placement of treating fluids, various techniques have been employed. Mechanical techniques involve for instance the use of ball sealers and packers and of coiled tubing placement to specifically spot the fluid across the zone of interest. Non mechanical techniques typically make use of gelling agents as diverters for temporary impairing the areas of higher permeability and increasing the proportion of the treating zone that goes into the areas of lower permeability. Of course, a diverter should not itself damage the reservoir and therefore it is important that it can be easily removed following the acid treatment so that the zones of higher permeability remain so.

Most commercialized chemical diverters are based on cross-linked polymers. Unfortunately, these systems leave residues in the formation, which can damage the formation, resulting in diminished hydrocarbon production. In addition, the cross-linking reaction is easily perturbed by formation chemistry, contaminants in the pumping equipment, and so forth.

It is also known to use self-diverting acids, typically consisting of hydrochloric acid mixed with a gelling agent and a pH-sensitive cross-linker. Self-diverting acids are typically designed to gel at intermediate pH values, when the acid is partially spent. Self-diverting systems not based on cross-linking chemistry by which rely upon viscoelastic surfactants are described in U.S. Pat. No. 4,695,389 (see also, U.S. Pat. No. 4,324,669, and British Patent No. 2,012,830, both cited there) which has a common assignee as the present application. Viscoelastic surfactants based systems exhibit very low friction pressure and therefore are easy to pump and yet, form a gel downhole. U.S. Pat. No. 4,695,389 discloses a viscoelastic surfactant-based gelling agent intended for use in acid fracturing. The particularly preferred embodiment is a fluid comprised of N,N-bis(2-hydroxyethyl) fatty amine acetic acid salt (the gelling agent), an alkali metal acetate salt, acetic acid (the acid which actually removes the damage from the formation), and water.

Improved self-diverting systems have been described in U.S. patent application Ser. No. 09/419,842, having a common assignee as the present application and its corresponding International Patent Application WO 01/29369. This application, hereby incorporated by reference, provides formulations suitable for acid treatment comprising an amphoteric surfactant that gels as the acid spends in presence of an activating amount of a co-surfactant and of multivalent cations typically generated by the acid reaction with the formation. When the gelling agent is mixed in hydrochloric acid, the co-surfactant prevents the gelling of the solution; the solution gels when the pH increases above 2.

In a preferred embodiment, the amphoteric surfactant is oleylpropyl betaine of the formula:

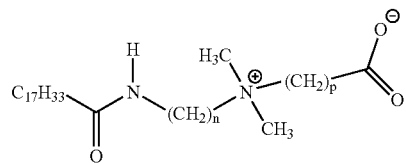

and the co-surfactant is preferably sodium dodecyl benzene sulfonate.

Compositions known from the U.S. patent application Ser. No. 09/419,842, and its corresponding International Patent Application WO 01/29369, have been of limited commercial applications due to temperature limitations. In particular, formulations based on oleylamidopropyl betaine and sodium dodecyl benzene sulfonate can only be used for temperature below about 200° F. (93° C.) while the carbonate acidizing market calls for temperature up to about 300° F. (about 150° C.).

According to a first embodiment of the present invention, there is provided a method for stimulating a subterranean hydrocarbons reservoir comprising contacting the formation with a treating fluid consisting of an acid, erucylamidopropyl betaine (or a protonated, deprotonated, homolog or salt thereof), and an-alcohol, typically selected among methanol and/or ethanol, and most preferably being methanol. The formulation of the present invention may also comprise various standard additives such as corrosion inhibitors, non-emulsifiers and iron control agents. One embodiment is a method of treating a subterranean formation involving contacting the formation with a treating fluid containing an aqueous solution, an acid selected from an organic acid at a concentration of greater than 12% and an inorganic acid, and a surfactant acting as gelling agent essentially consisting of erucylamidopropyl betaine, or a protonated/deprotonated homolog or salt thereof, without a co-surfactant; preferably, the acid is present in the fluid at a concentration of at least 15% by weight.

SUMMARY OF INVENTION

According to a first embodiment of the present invention, there is provided a method for stimulating a subterranean hydrocarbons reservoir comprising contacting the formation with a treating fluid consisting of an acid, erucylamidopropyl betaine (or a protonated, deprotonated, homolog or salt thereof), and a n-alcohol, typically selected among methanol and/or ethanol, and most preferably being methanol. The formulation of the present invention may also comprise various standard additives such as corrosion inhibitors, non-emulsifiers and iron control agents.

As for the compositions known from U.S. patent application Ser. No. 09/419,842, the compositions of the present invention exhibit a nearly water-like viscosity upon addition of the acid to the base fluid consisting of water and the viscoelastic surfactant (the erucylamidopropyl betaine). A viscous gel starts to develop when the acid spends to react with a carbonate formation. The gel maintains a high viscosity so continuous diversion can be achieved during pumping. After completion of the job and resume of the hydrocarbon production, the produced hydrocarbons lower the gel viscosity down to near water-like viscosity, leaving no residue.

Most preferably the compositions of the present invention comprise methanol, preferably at concentration of between about 0.1% and about 10%, by volume, most preferably at concentration of between about 1 and 2% by volume. Methanol essentially performs two functions: it compensates for any loss of alcoholic solvent during mixing of fluids before pumping (BET-E as received contains about 22% isopropyl alcohol, however, addition of more isopropyl alcohol will have negative impact on fluid viscosity at high temperature. BET-E in spent acid needs certain range of alcohol concentration to have the optimum fluid performance) and improves solubility of BET-E surfactant in high concentration of spent acid at high temperature preventing the potential phase separation of surfactant from brine solution, thus improving the gel stability at high temperature. Consequently, the system of the present invention does not require the addition of a co-surfactant. In most cases, co-surfactant with shorter hydrocarbon chain decreases the gel stability at high temperatures.

The acid is selected from the group consisting of hydrochloric, a mixture of hydrochloric and hydrofluoric acids, fluoroboric acid, nitric acid, phosphoric acid, maleic acid, citric acid, acetic acid, and formic acid. According to a preferred embodiment of the invention, the acid is hydrochloric acid and is added at a concentration of between about 3% and about 28% by weight, most typically at concentration between about 15% and about 28%.

According to a preferred embodiment of the invention, the viscoelastic surfactant is added at a concentration of between about 1 and about 4%, by weight active material (the surfactant is typically delivered in solution). Most preferably, the surfactant is added at active concentration between about 2 and about 3% by weight. Higher concentrations may be used depending on the formation permeability range and contrast.

In a most preferred embodiment, for applications where the bottomhole static temperature ranges from about 25° C. to about 150° C., a formulation comprising 3 weight percent of viscoelastic surfactant and 1 volume percent of methanol is recommended.

Unlike other diverting materials, the fluids of the invention can be pumped as a single fluid, which will stimulate and divert in one step. It can be bullheaded down tubing or, according to a preferred embodiment, placed using coiled tubing moved up and down while injecting the acidic formulation. According to another embodiment, the fluid is pumped in several stages, alternately with regular acid stages.

As it is the rule for acid treatment, the formulation will typically comprise corrosion inhibitors, most preferably based on quaternary amines. Further agents may be typically added such as for instance non-emulsifier and iron reducing agent, chelating agent. It should be noted that the formulation of the present invention is sensitive to iron, in particular to ferric ions. A preflush treatment with iron reducing agent and chelating agent is therefore recommended before the acid treatment. Though the formulation of the invention is compatible with small concentration of non-emulsifying agent, to prevent emulsion and sludge, it is also a good practice to preflush the well with a mutual solvent, preferably low molecular weight esters, ether and alcohols, and more preferably ethylene glycol monobutyl ether.

Though the present Invention is directed primarily to matrix acidizing, it is entirely applicable to a closely related stimulation technique, acid fracturing, which is very similar, but involves pumping the acid at or above pressures sufficient to fracture the formation (minimum in situ rock stress). For convenience sake, the focus here shall be directed to matrix acidizing.

BRIEF DESCRIPTION OF DRAWINGS

The above and further objects, features and advantages of the present invention will be better understood by reference to the appended detailed description and to the drawings wherein:

FIGS. 1A and 1B show the viscosity profile of solutions comprising erucylamidopropyl betaine as a function of HCl spending (X axis is percentage of HCl being spent starting from 15% (1A) and 20% (1B), in other words, 8% shown in graph 1B indicates there is still 12% HCl in the solution)

DETAILED DESCRIPTION

The composition of the present invention are erucylamidopropyl betaine, an amphoteric surfactant having the general formula:

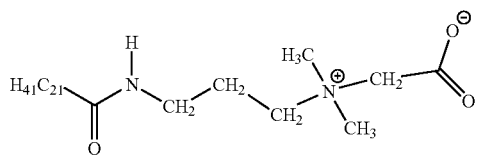

The viscosity development of a solution comprising erucylamidopropyl betaine during acid spent is illustrated FIGS. 1A and 1B. The test in FIG. 1A was performed at room temperature, with a solution comprising 15% HCl and 3wt % of erucylamidopropyl betaine. For the second test shown FIG. 1B, the solution comprised 20% HCl and 3wt % of erucylamidopropyl betaine. To be noted that in both figures, the X-axis is the percentage of HCl spent, starting from 15% (FIG. 1A) or 20% (FIG. 1-B). In other words, in FIG. 1B, 8% shown in graph indicates there is still 12% HCl in the solution). The viscosity was measured at a shear rate of 170 s$^{-1}$. As soon as the spending starts, the viscosity increases. To be noted that in practice, the gel is later broken by the hydrocarbons of the subterranean formation.

Figure 2A:
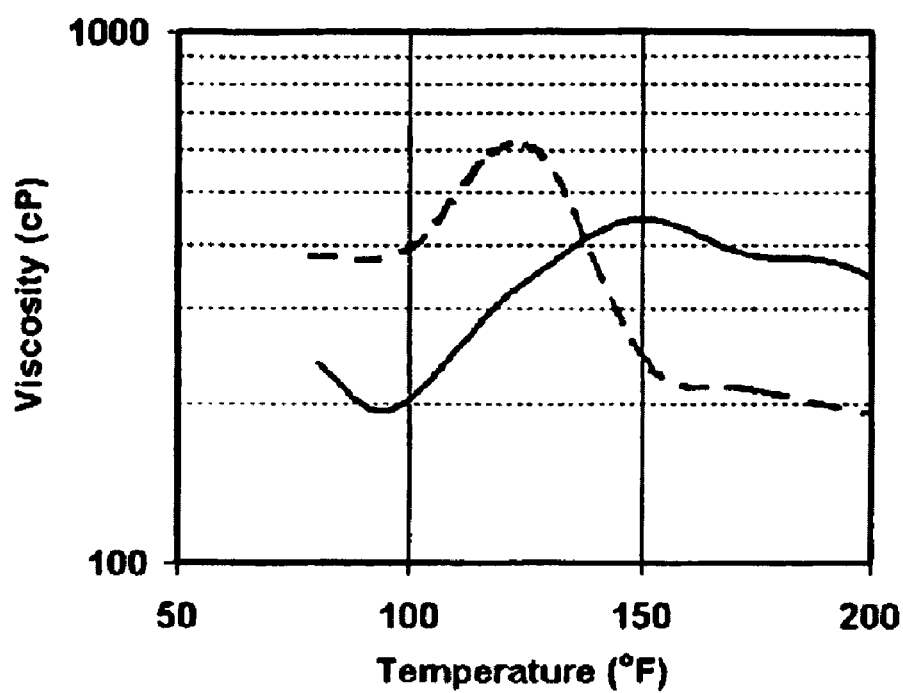
FIG. 2 shows the viscosity profile at a shear rate of 40 sec$^{-1}$, of two gels, with or without added methanol, at temperature ranging from room temperature to about 150° C.
Figure 2B:
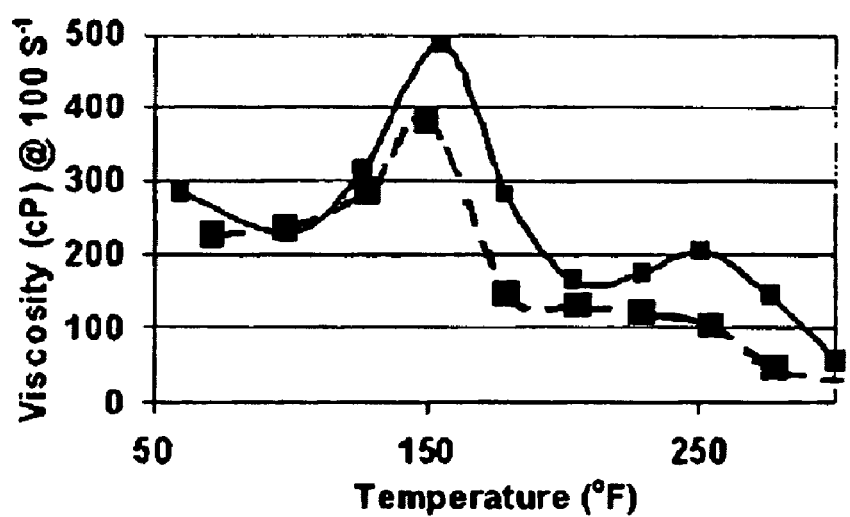

FIG. 2-A shows the viscosity (using a logarithm scale) of a gel at elevated temperature. The gel was prepared by adding first 0.6% of a corrosion inhibitor and 2% of corrosion inhibitor aid into a 20% HCl solution with or without methanol. The surfactant is then added to the solution at an active concentration of 3% by weight. After well dispersed, the mixture was then let react with powder $CaCO_3$ until the acid is neutralized to a pH value of 3.5 to 4 at 180° F. A viscoelastic gel forms when the pH reaches above 2 to 2.5. The gel is loaded in a Fann 50 rheometer to measure the viscosity (in CentiPoises or millipascals second) at specified temperatures, at a shear rate of 40 sec$^{-1}$.

The gel that does not contain methanol has a viscosity profile represented by a dotted line. The gel reaches a peak of viscosity for a temperature ranging between 120° F. and 130° F. (about 50° C.). At higher temperature, the viscosity sharply declines, followed by a lowered plateau near 100 cP from 150° F. to 200° F. (about 65° C. to about 93° C.). The addition of methanol (plain line) is detrimental to the quality of the gel at lower temperatures but helps extends the temperature at which the gel exhibits the maximum viscosity.

FIG. 2-B shows the viscosity at a shear rate of 100 sec$^{-1}$ of a gel at elevated temperature. The gel was prepared by preparing 42% $CaCl_2$ solution (simulated 28% HCl being spent with $CaCO_3$) with or without methanol and adding the surfactant to the solution at an active concentration of 3% by weight. The gel that does not contain methanol has a viscosity profile represented by a dotted line. The gel reaches a peak of viscosity for a temperature of about 150° F. and 130° F. (about 65° C.). At higher temperature, the viscosity sharply declines, followed by a lowered plateau near 200° F. (about 93° C.). In this test, the addition of methanol (plain line) is favorable to the quality of the gel at lower temperatures and higher temperature.

Figure 3:
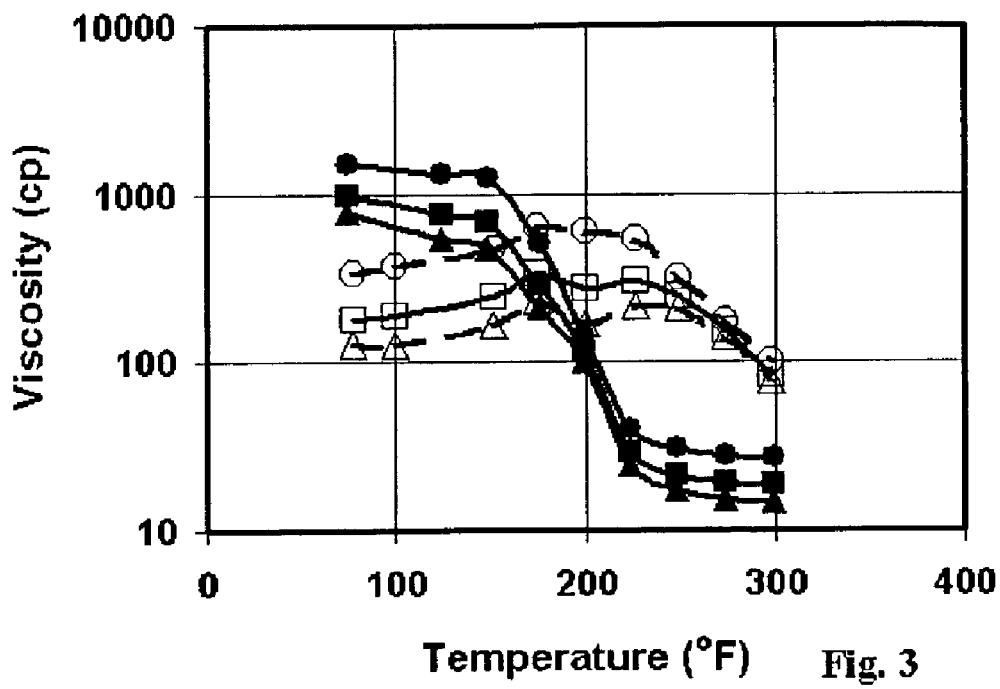
FIG. 3 shows the viscosity profile of gels, with or without added methanol, as a function of temperature and shear rate.

In FIG. 3, the viscosity of the gel at different shear rates (40, 100, and 170 sec$^{-1}$) is presented. The gels are prepared the same way as described in the example of FIG. 2-A, except for the starting HCl concentration. In this current example the HCl concentration used is 28% while in the previous example the acid concentration is 20% before spending. The BET-E surfactant is then added to the solution at an active concentration of 3% by weight.

To better reflect the shearing environment at which the gel is exposed during the well treatment, the rheology is represented by a cluster of curves corresponding to different shear rates (open marks for the gels without methanol, filled marks with; viscosity at shear rates respectively equal to 40, 70 and 170 are represented respectively by circles, squares and triangles. For the gel without methanol, the curves show a flat viscosity from 75° F. to 175° F., then the viscosity sharply declines in the temperature from 175° F. to 225° F., followed by a lowered plateau from 225° F. to 300° F. The second cluster of curves represents the gel made with 10% by volume methanol. The viscosity increases from 75° F. to 200° F. and maintained a plateau until 250° F., then a gentle decline toward 300° F.

Figure 4:
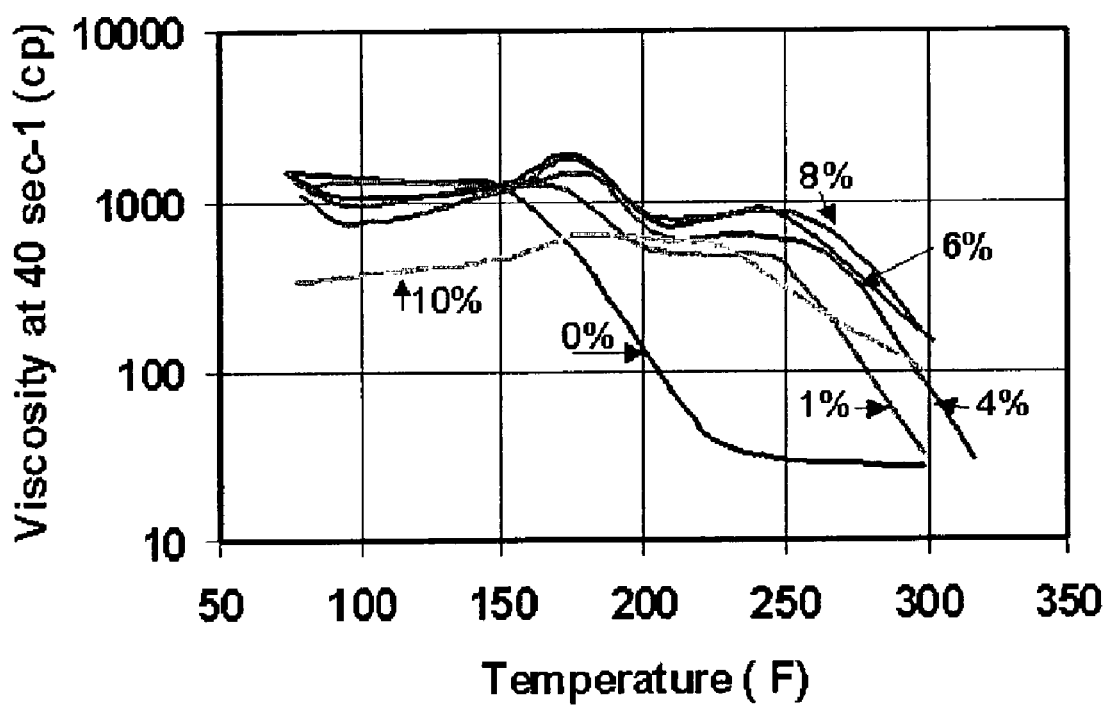
FIG. 4 shows the viscosity profile of various gels with various concentration of methanol, as a function of temperature.

FIG. 4 shows the viscosity of gels similar to the gels of the previous FIG. 3, thus comprising 3w % of surfactant and 28% HCl, with various volume concentration of methanol. The six tested compositions comprise respectively no methanol (0%), 1%, 4%, 6%, 8% and 10%. An addition of only 1% of methanol is enough to significantly improve the viscosity at temperatures ranging between about 200° F. and 250° F. (about 93° C. to about 120° C.). With higher concentrations of methanol, the temperature limit can be extended up to about 300° F. (about 150° C.). For the tested formulation, best results were obtained with compositions comprising between about 6% and 8% of methanol. Higher methanol concentrations lead to a decrease of the gel viscosity for lower temperature.

Figure 5:
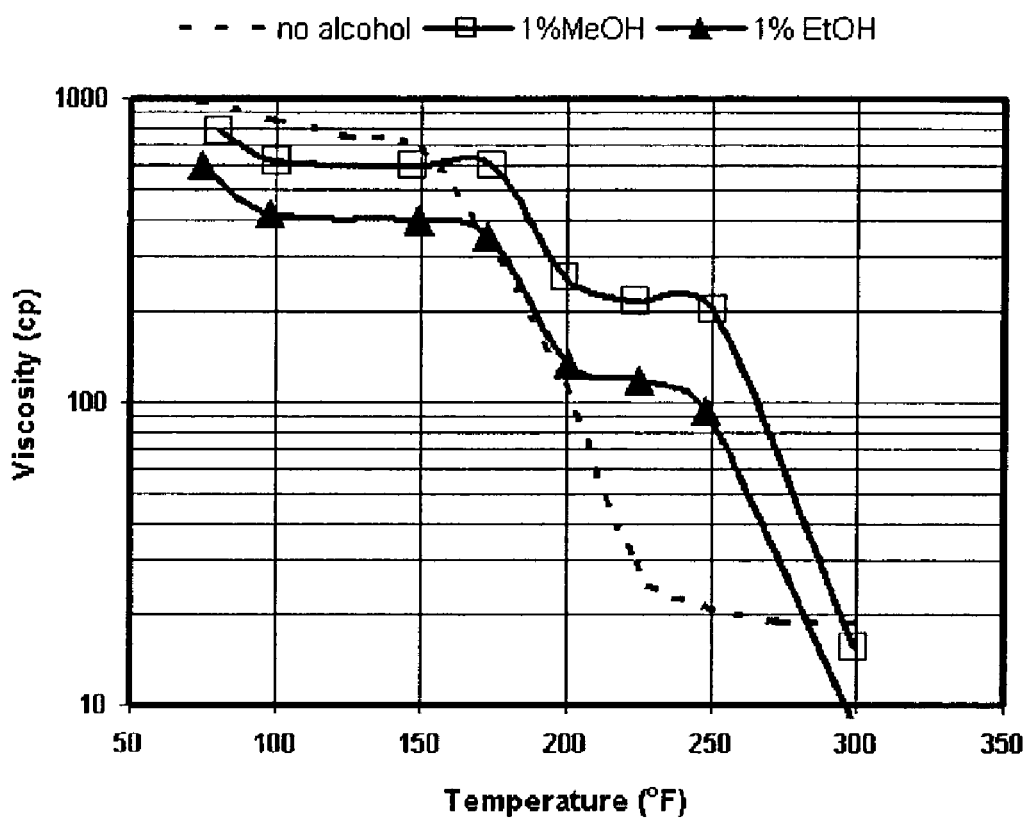
FIG. 5 shows comparative viscosity profiles of various gels with no alcohol, methanol and ethanol for a gel comprising 28% spent HCl.

FIG. 5 shows that ethanol also helps to extend the maximum temperature of use of the gel but to a much smaller extent. FIG. 5 presents results obtained with gels similar to the ones of FIGS. 3 and 4. The dotted line corresponds to a gel without alcohol; the open squares to a gel with 1% of methanol, the filled triangles to a gel with 1% of ethanol.

Figure 6:
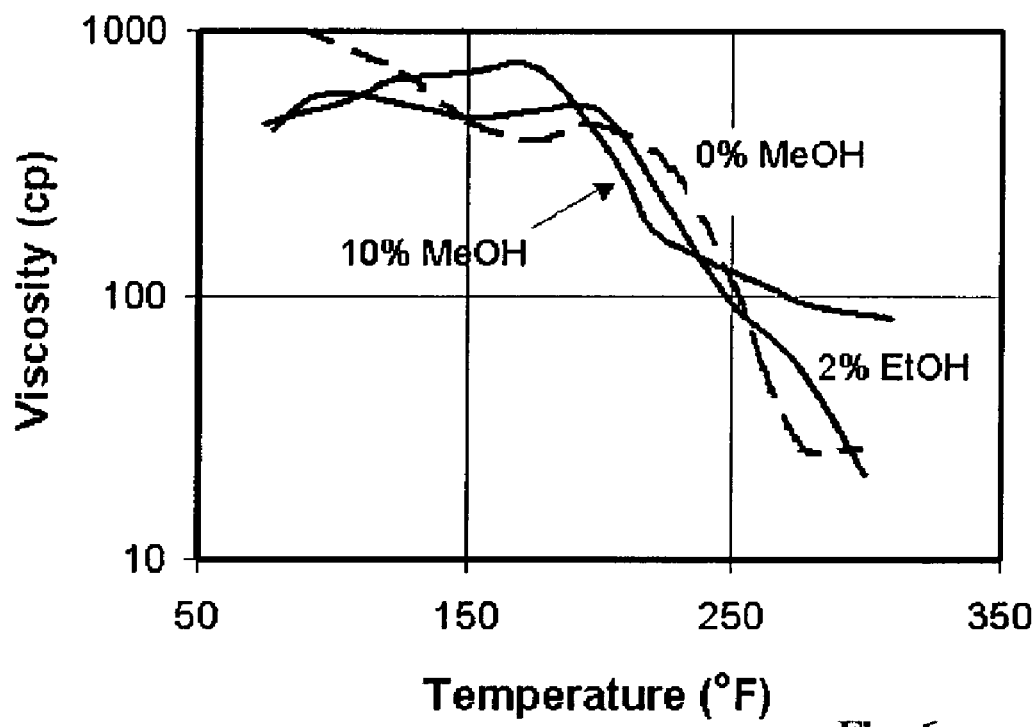
FIG. 6 shows comparative viscosity profiles of various gels with no alcohol, methanol and ethanol for a gel comprising 15% spent HCl.

FIG. 6 shows similar results obtained with a solution comprising only 15% HCl. Ethanol does not prove to be effective. Tests have shown that in 15% HCl, a solution comprising 5% of ethanol does not gel when acid spends.

Figure 7:
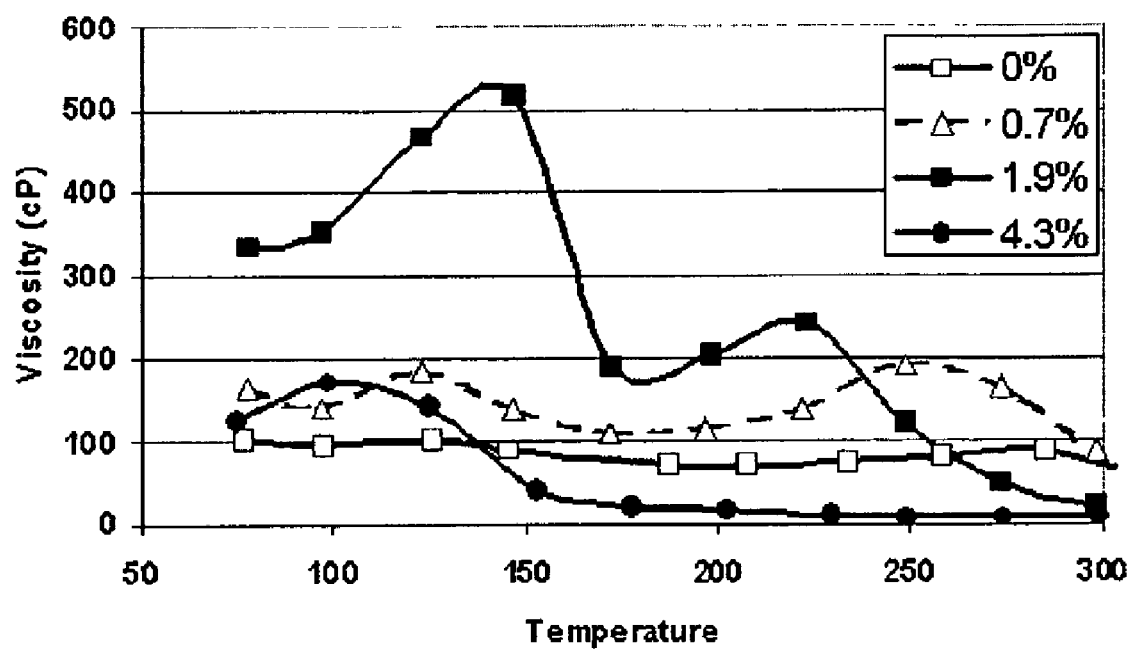
FIG. 7 shows the viscosity profile of various spent gels with various concentration of isopropanol, as a function of temperature.
Figure 8:
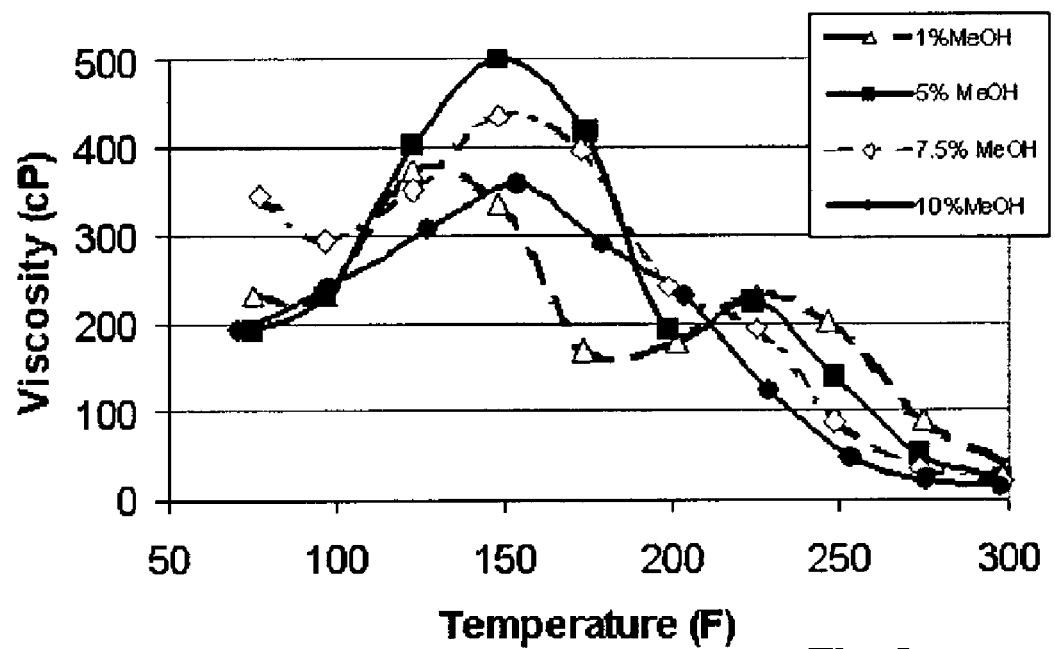
FIG. 8 shows the viscosity profile of various spent gels with various concentration of methanol, as a function of temperature.

FIGS. 7 and 8 show results performed with solutions that do not comprise hydrochloric acid, to get a viscosity profile similar to the one of the spent gel. FIG. 7 shows the effect of the addition of isopropanol. As it can be seen, though good performances can be achieved with about 2% of isopropanol, the fluid is very sensitive to variations of the amount of isopropanol. As a result, any evaporation of isopropanol during the job will damage fluid performance. On the other hand, addition of methanol will minimize the effect of solvent evaporation without decreasing fluid performance as shown FIG. 8. Therefore, concentrations of methanol between about 1% and about 8% by volume are typically preferred.

The invention claimed is:

1. A method of treating a subterranean hydrocarbons reservoir comprising contacting the formation with a treating fluid comprising an aqueous solution, an acid, methanol at a concentration of between 0.1 and 10% by volume, and a surfactant acting as gelling agent essentially consisting of erucylamidopropyl betaine or a protonated/deprotonated homolog or salt thereof.

2. The method of claim 1, wherein the methanol is present in said fluid at a concentration of between 1% and 8% by volume.

3. The method of claim 1, wherein said acid is selected from the group consisting of hydrochloric acid, a mixture of hydrofluoric acid and hydrochloric acid, acetic acid and formic acid.

4. The method of claim 2, wherein said acid is present in said fluid at a concentration of between 3 and 28% by weight.

5. The method of claim 2, wherein the treating fluid further comprises at least one additive selected among corrosion inhibitors, non-emulsifiers, iron reducing agents and chelating agents.

6. The method of claim 1, wherein the erucylamidopropyl betaine is present in said fluid at a concentration of between about 1 and about 4% by weight.

7. The method of claim 5 wherein the erucylamidopropyl betaine is present in said fluid at a concentration of between 2 and 3% by weight.

8. A method of treating a subterranean hydrocarbons reservoir penetrated by a well, said well having a bottomhole static temperature ranging between about 25° C. and about 150° C., comprising contacting the formation with a treating fluid comprising an aqueous solution, about 15 to about 28% by weight of hydrochloric acid, about one volume percent of methanol, and about 3 weight percent of erucylamidopropyl betaine.

9. A method of treating a subterranean formation comprising contacting the formation with a mutual solvent and then, contacting the formation with a treating fluid comprising an aqueous solution, acid, methanol, and erucylamidopropyl betaine.

10. The method of claim 1 wherein said acid is selected from the group consisting of fluoroboric acid, nitric acid, phosphoric acid, maleic acid, and citric acid.

* * * * *